US006848314B2

(12) United States Patent
Goldman

(10) Patent No.: US 6,848,314 B2
(45) Date of Patent: Feb. 1, 2005

(54) DATA RECEIVING DEVICE FOR USE IN AN IMPULSE-BASED DATA TRANSMISSION SYSTEM

(76) Inventor: Ilan Goldman, Hayasmin Street 3, 46631 Herzliya (IL)

( * ) Notice: Subject to any disclaimer, the term of this patent is extended or adjusted under 35 U.S.C. 154(b) by 60 days.

(21) Appl. No.: 10/203,316

(22) PCT Filed: Feb. 9, 2001

(86) PCT No.: PCT/IL01/00133

§ 371 (c)(1),
(2), (4) Date: Sep. 13, 2002

(87) PCT Pub. No.: WO01/59238

PCT Pub. Date: Aug. 16, 2001

(65) Prior Publication Data

US 2004/0040754 A1 Mar. 4, 2004

(30) Foreign Application Priority Data

Feb. 10, 2000 (IL) .................................................. 134470

(51) Int. Cl.$^7$ ................................................ G06F 7/04
(52) U.S. Cl. ............................. 73/649; 73/651; 73/652; 73/432.1; 340/5.1; 340/5.2; 340/5.67; 340/5.7; 340/407.1; 340/543; 70/278.1
(58) Field of Search .......................... 73/570, 649, 651, 73/652, 662, 432.1; 340/5.1, 5.2, 5.67, 5.7, 407.1, 543; 70/278.1

(56) References Cited

U.S. PATENT DOCUMENTS

| 4,197,524 | A |   | 4/1980  | Salem ....................... 340/5.51 |
| 5,264,795 | A | * | 11/1993 | Rider ......................... 324/326 |
| 5,524,489 | A |   | 6/1996  | Twigg ...................... 73/514.38 |
| 6,411,195 | B1 | * | 6/2002  | Goldman .................... 340/5.1 |
| 2002/0165013 | A1 | * | 11/2002 | Bright et al. ............... 455/567 |

FOREIGN PATENT DOCUMENTS

| JP | 01 250832 A | 10/1989 |
| JP | 10 009944 A | 1/1998 |
| WO | 96 12121 A | 4/1996 |
| WO | 98 39539 A | 9/1998 |

* cited by examiner

Primary Examiner—Hezron Williams
Assistant Examiner—Rose M. Miller
(74) Attorney, Agent, or Firm—Birch, Stewart, Kolasch & Birch, LLP

(57) ABSTRACT

A device (10) for receiving date transmitted as impulses through an input transmission body (16) is provided. The device (10) has a vibration sensitive transducer (50) which constitutes part of a floating mass assembly (40) with a pick-up portion (42). The pick-up portion (42) is biased towards a surface of a rigid body that is either the input transmission body (16) or a vibrations transmissive member (151). The assembly (40) has a freedom of movement permitting it to vibrate independently from the rigid body.

11 Claims, 3 Drawing Sheets

DATA RECEIVING DEVICE FOR USE IN AN IMPULSE-BASED DATA TRANSMISSION SYSTEM

This application is the national phase under 35 U.S.C. § 371 of PCT International Application No. PCT/IL01/00133 which has an International filing date of Feb. 9, 2001, which designated the United States of America.

FIELD OF THE INVENTION

A data receiving device for receiving data encoded as impulses that are transmitted through a impact transmission body.

BACKGROUND OF INVENTION

In WO98/395339, there is illustrated and described an impulse-based data transmission system including a data transmitting device for imparting a series of impulse-like mechanical impacts to an impact transmissive body which are picked up by an impact sensitive transducer of a data receiving device remote from the data transmitting device.

An exemplary implementation of an impulse-based data transmission system is an electronic key (incorporating a data transmitting device) for opening an electronic mortise lock (incorporating a data receiving device) screw mounted on a door by four screws typically peripherally disposed at the lock's four corners.

Several factors including inter alia the ce of an impact transmissive is body and its size and thickness, the impulses need to travel between an impeller head and the impact sensitive transducer, the properties of the data receiving device, amongst others all affect the reception of the transmitted data

SUMMARY OF THE INVENTION

The present invention is based on the realization that in order to improve the data receiving capability of an impact sensitive transducer rather than fixing the transducer to be in a firm association with impact transmissive body, e.g. firmly attached to the of the impact transmissive body or mounted on a member firmly fixed thereto, the impact sensitive transducer should be fixed in a manner such that the member on which it fixed can vibrate, so what independently, as a result of said impact.

Thus, in accordance with the invention a data receiving device is employed with a floating mass transducer, wherein the impact sensitive transducer is included as part of a floating mass assembly.

The invention thus provides, in accordance witch one of its aspects, a device with a housing having a primary surface attached to an impact transmissive body, and a vibration sensitive transducer for picking up vibrations from the impact transmissive body. The device in accordance with the invention is characterized in that is a data receiving device for receiving data encoded as impulses transmitted through the impact transmissive body, and further in that the vibration sensitive transducer constitutes part of a floating mass transducer assembly which has a pick-up portion biased towards surface of a rigid body, the rigid by being either the impact transmissive body or being a vibrations transmissive member within the device which is in a vibration receiving association with the impact transmissive body. The floating mass transducer assembly has a freedom of movement which permits it to vibrate independently from said rigid body.

In accordance with another aspect, the invention provides a data transmission system which comprises at least one data transmitting device and at least one data receiving device, with the data being encoded as impulses that are transmitted through an impact transmissive body. The data transmitting device and the data receiving device are adapted to respectively transmit and receive data that is encoded as vibrations through said body. The system in accordance with the invention is characterized by its data receiving device having the features as defined above.

The invention further provides in accordance with a further of its aspects, a method for transmission of data, encoded as impulses, through an impact transmissive body. The method comprises, at the source of the data, impacting the impact transmissive body in a coded fashion to yield a series of impacts which encode the data, and at a destination, picking up vibrations from said impact transmissive body and decoding them into said data. This method, as uniquely provided by the present invention, makes use of the vibrations pick-up principle operating in said device.

The system of the invention is useful for a variety of applications in which it is advantageous to transmit data in the form of a series of impulses. For example, it may be used for access control, with the transmitted impulses being a code that once received and coded by said device permits access. Such a form of access control may be used, for example, for opening or closing a safe, or a security door leading to a secured instillation, or for activating a device, e.g. a computer, which contains sensitive information.

Other exemplary applications for the system of the invention include communication between a sensor, e.g. between a sensor of a security system and central controller in which case the data transmissive body will typically be walls of a building or the like). Another exemplary application is in the control of of operation of remote devices, e.g. control of the function of the motor of an air condition device from a remote controller (the impact transmissive body in this case may be the pipe transferring cooling/heating liquids between the motor aud the radiator unit.)

As will no doubt be appreciated, in use the device of the invention is connected or comprises an electronic circuitry for decoding the impulses into data.

The invention will now be illustrated in some further details with a reference to some non-limiting specific embodiments.

BRIEF DESCRIPTION OF THE DRAWINGS

In order to understand the invention and to see how it may be carried out in practice, several embodiments will now be described, by way of non-limiting examples only, with reference to the accompanying drawings in which.

DETAILED DESCRIPTION OF THE SPECIFIC EMBODIMENTS

Figure 1:
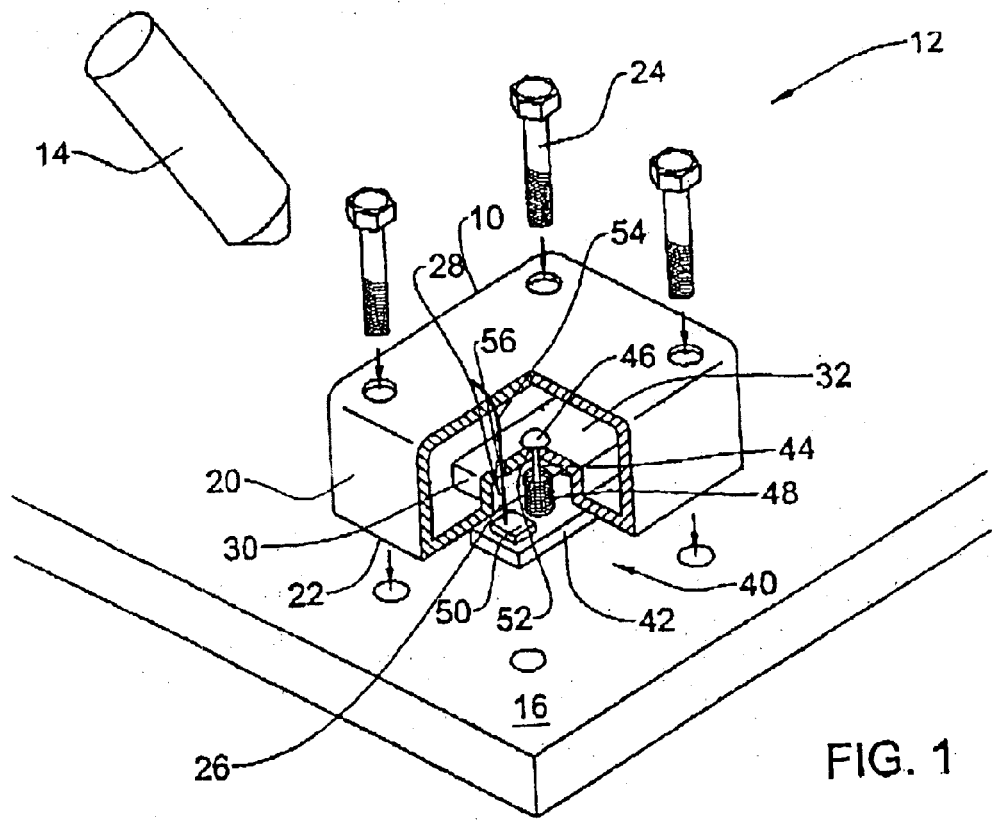
FIGS. 1 and 2 are perspective partially cut-out representations illustrating an impulse based data transmission system including a data transmitting device and one embodiment of a data receiving device in accordance with the present invention before and after mounting of the data receiving device on an impact transmissive body.
Figure 2:
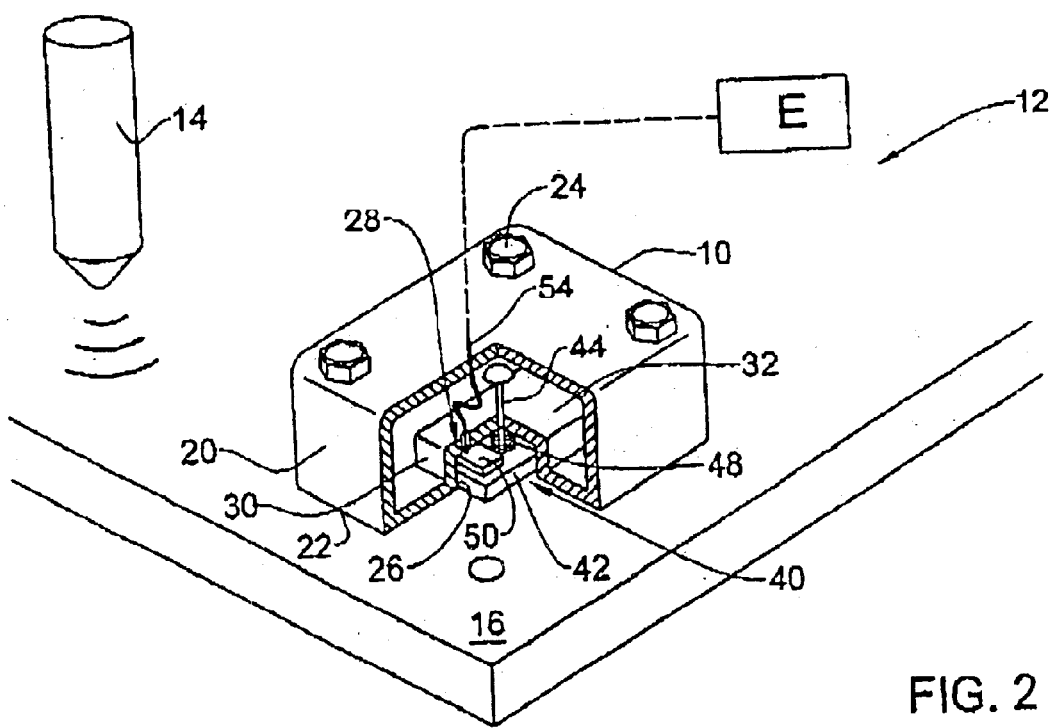

Reference is first being made to FIGS. 1 and 2 showing a data receiving device 10 which forms part of an impulse-based data transmission system 12 which includes also a data siting device 14. The data is transmitted as a series of mechanical impulses through the impact transmissive body 16. As will be appreciated system 12 may comprise two or more of each of the data receiving device 10 or the data transmitting device 14.

The data receiving device 10 includes a hosing 20 with a primary surface 22 for attachment against the impact transmissive body 3. Data receiving device 10 may be firmly attached to body 16 by a variety of means, including gluing, welding or, as shown, by the use of screws 24. Primary surface 22 has an opening in its central portion 26 defined by a recess 28 with side 30 and a top wall 32.

Included in the device is a floating mass transducer assembly 40 which includes a pick-up portion 42 in the form of a thin rectangular plate, a pin 44 with a head 46 fixed to said plate, a biasing helical spring 48 and a vibration transducer module 50 mounted on the top surface of the vibration pick-up portion 42.

Pin 44 protrudes through an opening 52 in the top wall 32 of recess 28 whereby head 46 limits the downward displacement of the floating mass transducer assembly.

The vibrations transducer 50 is connected, through an electric lead 54, standing through an aperture 56 formed in wall 32. As represented schematically in FIG. 2, lead 54 connects transducer 50 to an electronic module E. Module E may be housed within device 10 or may be external thereto. Module E my then be linked to other devices or apparatuses (not shown).

When data receiving device 10 is firmly fixed to the impact transmissive body 16, represented in FIG. 2, which in this case, as pointed out above, is achieved through the use of screws 24, member 42 recedes into recess 28 while the biasing force of spring 48 urges members 42 firmly against a surface of body 16. The recess is designed in a manner so that side walls 30 are of sufficient height to permit some space for movement of the floating mass transducer assembly 40 along the axis defined as pin 44. Thus, when data transmitting device 14 impacts the impact transmissive body 16, the mechanical vibrations travelling through body 16 reach device 10 and upon impacting onto member 42 they cause some essentially independent vibrations of a assembly 40 and these vibrations are then picked up by transducer 50 and transmitted to electronic module E where they are decoded into the data they represent.

Figure 3:
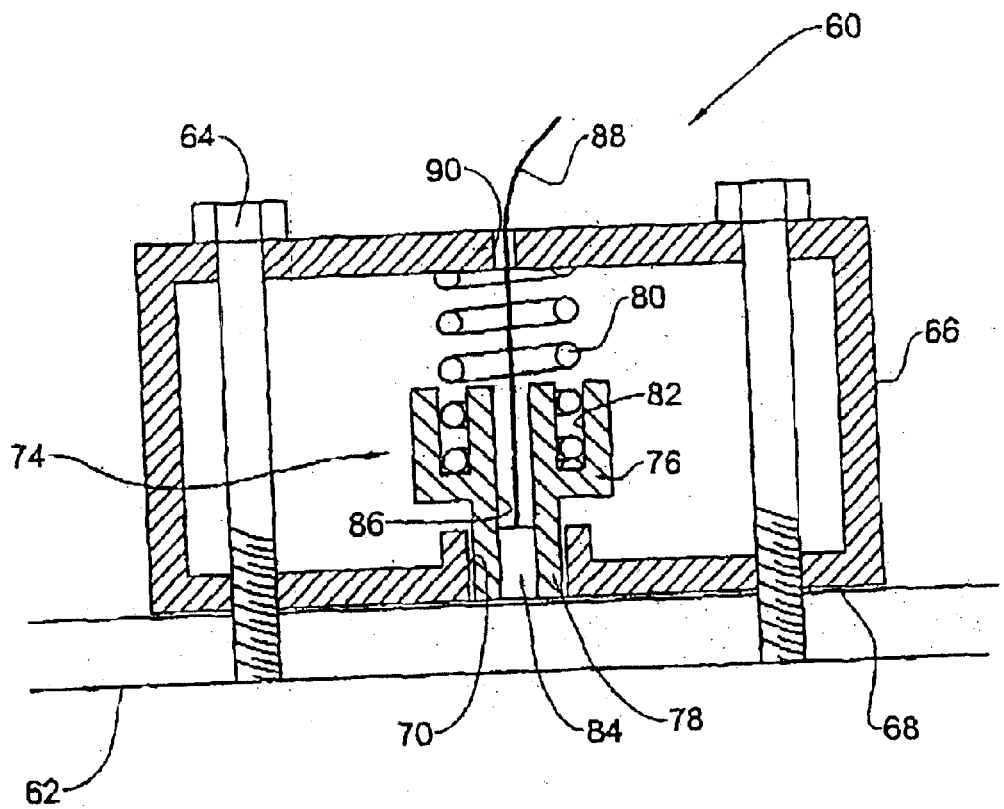
FIG. 3 is a cross section representation illustrating another embodiment of a data receiving device in accordance with the preset invention.

A data receiving device 60 in accordance with another embodiment is shown in FIG. 3. This device, similarly as that in FIG. 1, is mounted onto impact transmissive body 62 by means of screws 64. Device 60 has a housing 66 with a bottom, primary surface 68 formed with an opening 70.

Figure 4:
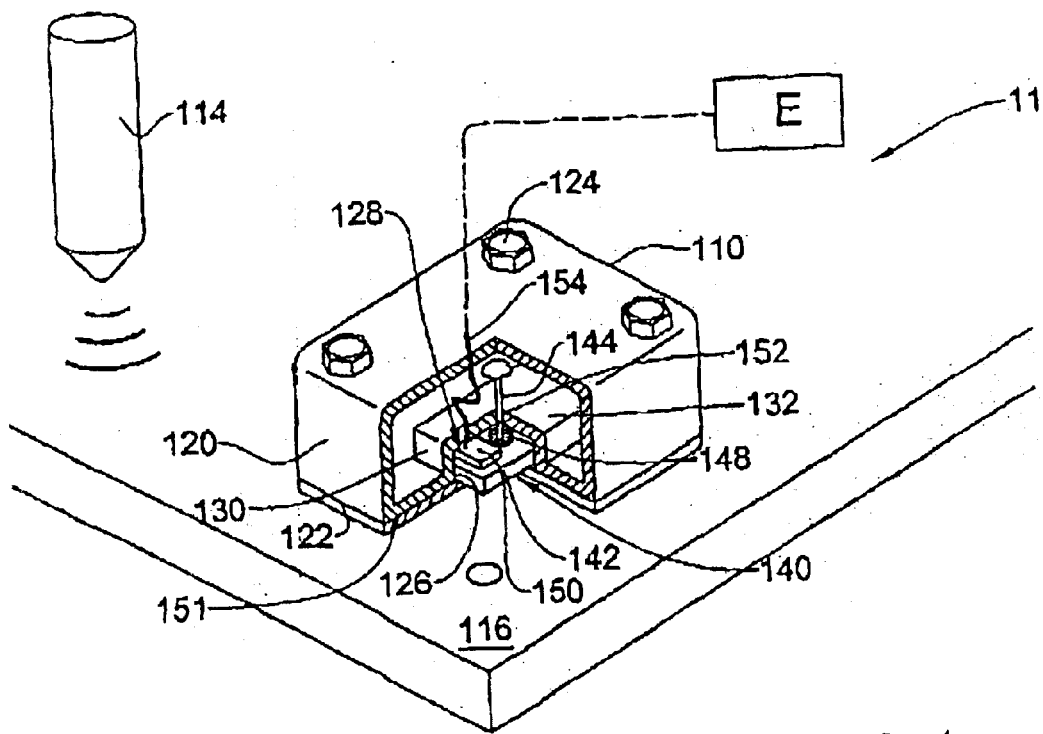
FIG. 4 is a perspective representation of a data transmitting device in accordance with another embodiment of the invention.

The floating mas transducer assembly 74 consists of a vibration pick-up member 76 with a bottom pick-up portion 78, a biasing 80, received at its bottom in annular recess 82 and a vibration pick-up transducer 84. The vibration pick-up transducer 84 is housed in the bottom part (that being within the transducer portion) of a central longitudinal bore 86. Electric lead 88 extending out of opening 90 in housing 66, connected transducer 84 with an electric module (not shown). In an analogous manner to that of the embodiment of FIGS. 1 and 2, biasing spring 80 urges data portion 78 towards the surface of the impact transmissive body 62. In distinction from the embodiment of FIGS. 1 and 2, in the device of FIG. 3, the transducer 84 is in direct contact with body 62. FIG. 4 depicts a device of an embodiment very similar to that shown in FIG. 1. Like elements were given the same reference numerals to those of FIG. 1, however shifted by 100 (10 to 110, 48 to 148, etc.). The major difference resides in the addition of vibrations sensitive member in the form of a plate 151. In this manner, recess 128 is formed into a permanent enclosure defined between plate 151 and walls 130 and 132. Thus member 142 is biased, by means of spring 148 against plate 151. Vibrations impacted into impact transmissive body 116 by device 114 will thus cause a vibration of plate 151 which in turn will cause the vertical vibrations of assembly 140.

Figure 5:
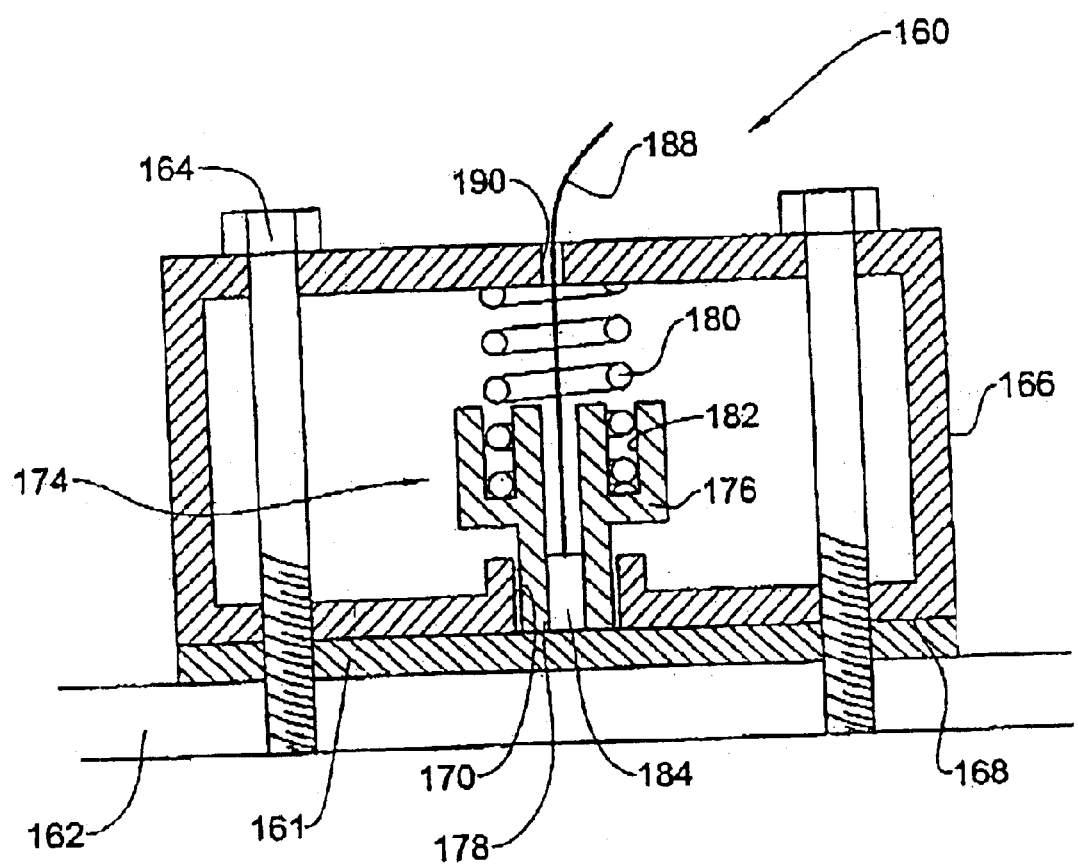
FIG. 5 is a cross section of a data receiving device in accordance with another embodiment of the invention.

Reference is now being made to FIG. 5 showing an embodiment which is a modification of the embodiment shown in FIG. 3. Accordingly, like components were given the same reference numerals shifted by 100. The difference resides in the addition of a vibrations transmissive member in the form of plate 161 attached to the bottom surface 168 of housing 166. Thus, the impact transmissive portion 178 bears against plate 161. Thus, vibrations reaching device 160 will impact pick-up portion 178 through plate 161.

One advantage of the embodiments shown in FIGS. 4 and 5 bears the respective corresponding embodiments in FIGS. 1–2 and 3 are that the device, with its sensitive moving part is now fully enclosed and thus less sensitive for handling and damages that may arise out of improper handling.

While the invention has been described with respect to a limited number of embodiment, it will be appreciated that many variations, modifications and other applications of the inanition can be made which fall within the scope of the claims appended hereto. For example, the outermost portion of the floating mass transducer which is contactingly urged against an impact transmissive body may include the impact sensitive transducer 4 (see FIG. 3).

What is claimed is:

1. A device comprising a housing (20) having a primary surface (22) attachable to an impact transmissive body (16), and a vibrations sensitive transducer (50) for picking up vibrations from the impact transmissive body (16); the device (10) being characterized in that the device (10) is a data receiving device for receiving data encoded as impulses transmitted through the impact transmissive body (16); said vibrations sensitive transducer (50) constitutes part of a floating mass transducer assembly (40) and having a pick-up portion (42) which is biased towards a surface of rigid body being either said impact transmissive body (16) or a vibrations transmissive member (151) of the device which is a vibration receiving association with said impact transmissive body, said assembly having a freedom of movement permitting it to vibrate independently from said rigid body (16, 151).

2. A device according to claim 1, wherein said freedom of movement is along an axis that is normal to the surface of said rigid body (16).

3. A device according to claim 1, comprising a housing (20) with a primary surface (22) which is attached to the impact transmissive body (16), said primary surface has an aperture (26), said pick-up portion is biased to protrude through said aperture (26) against said impact transmissive body (16).

4. A device according to claim 3, wherein the pick-up portion is a thin rigid planar member (50) accommodated within a recess (28) formed in said primary surface (22), with side (30) and top walls (32), said planar member (50)

being biased away from said top wall (32) and towards said impact transmissive body (16); the vertical distance between the primary surface (22) and top wall (32) of the recess being such so as to permit some vertical displaced of the floating mass transducer assembly (40) when said planar member (50) is housed within said recess (28) and leaning against said impact transmissive body (16).

5. A device (110) according to claim 1 comprising said vibrations transmissive member (151), wherein the floating mass transducer assembly (140) is housed within a housing having an aperture (126) at a surface thereof that juxtaposes said vibrations transmissive member (151), said pick-up portion (142) is biased to protrude through said aperture (126).

6. A data transmission system (12) comprising at least one data transmitting device (14) and at least one data receiving device (10), the data being encoded as impulses transmitted through an impact transmissive body (16) with the data transmitting device (14) and the data receiving device (10) being adapted to, respectively, transmit and receive data encoded as vibrations through said body, the system (12) being characterized in that said data receiving device (10) has a vibrations sensitive transducer (50) constituting part of a floating is a transducer assembly (40) and having a pick-up portion (42) which is biased towards a rigid body being either said impact transmissive body (16) or a vibrations transmissive member (151) of the device (10) which is in a vibration receiving association with said impact transmissive body (16), said assembly (40) having a freedom of movement permitting it to vibrate independently from said rigid body (16, 151).

7. A data transmission system (12) according to claim 6, wherein said freedom of movement is along an axis that is normal to the surface of said rigid body (16).

8. A data transmission system (12) according to claim 6, wherein the data receiving device (10) comprises a housing (20) with a primary surface (22) which is attached to the impact transmissive body (16), said primary surface has an aperture (26), said pick-up portion (42) is biased to protrude through said aperture (26) against said impact transmissive body.

9. A data transmission system (12) according to claim 8, wherein said device (10) has a floating mass transducer assembly (40) in which the pick-up portion is a thin rigid planar member (42) accommodated within a recess (28) formed in said primary surface, with side (30) and top (32) walls, said planar member (42) being biased away form said top wall (32) and towards said impact transmissive body (16); the vertical distance between the primary surface (22) and top wall of the recess (28) being such so as to permit some vertical displaced of the floating mass transducer assembly (40) when said planar member (42) is housed within said recess (28) and leaning against said impact transmissive body (16).

10. A data transmission system (112) according to claim 6, wherein the data receiving device (110) comprises said vibrations transmissive member (151), wherein the floating mass transducer assembly (140) is housed within a housing (120) having an opening (126) at a surface thereof that juxtaposes said vibrations transmissive member (151), said pick-up portion (142) is biased to protrude through said aperture (126) against said vibrations sensitive member (151).

11. A method for transmission of data, encoded as impulses, through an impact transmissive body, comprising:
   i. at a source of said data, impacting said impact transmissive body in a coded fashion to yield a series of impacts encoding said data;
   ii. at a destination, picking up vibrations from said impact transmissive body and decoding them into said data
   the vibrations pick-up at said destination is through a floating mass transducer assembly having a vibrations transducer and a pick-up portion which is biased towards a rigid body being said impact transmissive body or a member which is in a vibration receiving association with said impact transmissive body, said assembly having a freedom of movement permitting it to vibrate independently from said pick-up body, whereby upon receipt of impacts said floating mass assembly is induced into vibrations which are picked up by said vibrations transducer.

* * * * *